United States Patent [19]

Zievers

[11] Patent Number: 4,968,467
[45] Date of Patent: Nov. 6, 1990

[54] HOT GAS FILTER

[75] Inventor: James F. Zievers, LaGrange, Ill.

[73] Assignee: Industrial Filter & Pump Mfg. Co., Cicero, Ill.

[21] Appl. No.: 377,228

[22] Filed: Jul. 10, 1989

[51] Int. Cl.$^5$ .............. C04B 41/50; B01D 39/20
[52] U.S. Cl. ........................ 264/62; 55/523; 55/524; 55/DIG. 5; 264/63
[58] Field of Search .......... 55/379, 523, 524, DIG. 5, 55/DIG. 10, DIG. 30; 264/62, 63

[56] References Cited

U.S. PATENT DOCUMENTS

| | | | |
|---|---|---|---|
| 3,236,665 | 2/1966 | King | 264/62 X |
| 3,932,161 | 1/1976 | McNish | 264/62 X |
| 4,264,346 | 4/1981 | Mann | 55/523 |
| 4,295,868 | 10/1981 | Hölter et al. | 55/523 X |
| 4,500,328 | 2/1985 | Brassell et al. | 55/523 X |
| 4,559,193 | 12/1985 | Ogawa et al. | 264/63 X |
| 4,560,478 | 12/1985 | Narumiya | 55/523 X |
| 4,568,595 | 2/1986 | Morris | 55/523 X |
| 4,629,483 | 12/1986 | Stanton | 55/523 X |
| 4,652,286 | 3/1987 | Kusuda et al. | 55/DIG. 30 |
| 4,687,579 | 8/1987 | Bergman | 55/523 X |
| 4,692,176 | 9/1987 | Israelson | 55/523 X |
| 4,713,174 | 12/1987 | Zievers et al. | 55/379 X |
| 4,728,503 | 3/1988 | Iida et al. | 55/DIG. 30 |
| 4,732,594 | 3/1988 | Mizrah et al. | 55/523 |
| 4,746,341 | 5/1988 | Komoda | 55/524 |
| 4,759,918 | 7/1988 | Homeier et al. | 55/DIG. 30 |
| 4,772,508 | 9/1988 | Brassell | 55/523 X |
| 4,791,785 | 12/1988 | Hudson et al. | 55/523 X |
| 4,798,615 | 1/1989 | Fukuta et al. | 55/523 X |

FOREIGN PATENT DOCUMENTS

| | | | |
|---|---|---|---|
| 87738 | 8/1959 | Denmark | 55/523 |
| 55-119413 | 9/1980 | Japan | 55/523 |
| 58-081419 | 5/1983 | Japan | 55/523 |
| 1476481 | 6/1977 | United Kingdom | 55/524 |

Primary Examiner—Robert Spitzer
Attorney, Agent, or Firm—Edmond Patnaude

[57] ABSTRACT

A ceramic filter element for filtering hot gasses is manufactured by first forming a skeletal member made up of randomly disposed ceramic fibers by pulling an aqueous solution of the fibers and a liquid binder onto a mandrel and then heat treating the member to dry the binder. The dried member is then coated with alumina gel, colloidal aluminum or colloidal silica and heat treated at a temperature within the range of 1700 degrees F. to 2300 degrees F. to dry the coating and increase the resistance of the coating to corrosion by hot gasses.

2 Claims, 1 Drawing Sheet

HOT GAS FILTER

The present invention relates in general to filters for removing particulates from a stream of hot gas such, for example as flue gas, and it relates more particularly to a new and improved filter element and to a method of manufacturing it.

BACKGROUND OF THE INVENTION

The use of ceramic filter elements for filtering hot flue gasses and the like is well known, and the use of such filter elements is shown, for example, in U.S. Pat. No. 4,713,174. A method of manufacturing ceramic filter elements in a molding operation is described in U.S. Pat. No. 4,629,483. Such filter elements perform well but they are expensive to manufacture, they are heavy, and they are relatively fragile.

It would be desirable to improve the method of manufacturing high temperature filter elements so as to reduce the cost thereof while providing a lighter, stronger and more durable filter element which functions at least as well as the ceramic filter elements now known in the art.

SUMMARY OF THE INVENTION

Briefly, there is provided in accordance with the present invention a new and improved method of manufacturing high temperature filter elements and a new and improved filter element for use in the filtration of hot gasses. When manufacturing a filter element using the method of the present invention a filter element skeletal form is initially made from a multiplicity of short SiO fibers with about ten percent binder to provide a mat-like skeletal form having a mean pore size of between about 10 and 200 microns. Preferably, cylindrical individual fibers having a length in the range of five to ten milimeters and a diameter between two and three microns are vacuum formed onto a mandrel to the desired shape such, for example, as a hollow candle or tube. While the pore size of the fiber form is too large to be suitable for most filtering applications it provides a relatively uniform base.

The mat-like fibrous form is then contacted with Alpha Alumina gel or colloidal aluminum to reduce the mean pore size to an acceptable level and to strengthen the element. The mat form may be contacted and coated by totally immersing the mat in liquid Alpha Alumina or colloidal aluminum to provide a filter element form in which the pore size is uniformly distributed throughout the form. Where, however, it is desired that the filter element have an outer surface which has a mean pore size which is less than that in the interior of the element, the Alpha Alumina or colloidal aluminum may be applied only to the outer surface of the mat base by spraying, brushing or rolling or it may be applied in any other suitable manner. Moreover, the fiber mat-like form may be first immersed in a bath of liquid Alpha Alumina or colloidal aluminum to coat the internal fibers uniformly, and then the upstream and/or downstream surfaces of the skeletal form can be further coated with additional Alpha Alumina to provide a less porous filter coat at one or both surfaces.

GENERAL DESCRIPTION OF THE DRAWING

Further objects and advantages and a better understanding of the present invention will be had by reference to the following detailed description taken in connection with the accompanying drawing wherein.

DETAILED DESCRIPTION OF A PREFERRED EMBODIMENT OF THE INVENTION

Figure 1:
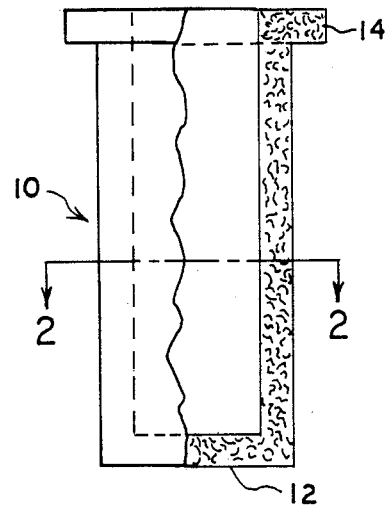
FIG. 1 is an elevational view, partly in cross-section, of a filter element embodying the present invention.
Figure 2:
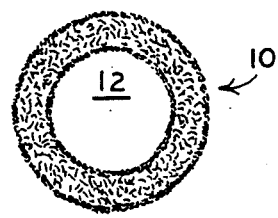
FIG. 2 is a cross-sectional view taken along the line 2—2 of FIG. 1, assuming the entire device to be shown in FIG. 1.
Figure 3:
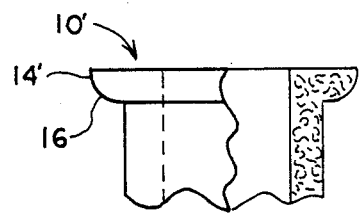
FIG. 3 is a fragmentary view of an alternative filter element.

Referring to FIG. 1, there is shown a hollow cylindrical filter element 10 which is closed at the bottom by an integral circular end wall 12 and which includes an integral external annular flange 14 at the top. This configuration is common for ceramic filter tubes used in high temperature applications as in the filtration of flue gasses where temperatures are of the order of 1600 degrees F. In FIG. 3 there is shown an alternative filter element 10' wherein the flange 14' has an arcuate lower surface 16 to increase the resistance of the filter element to fracture at the juncture between the flange 14' and the cylindrical body of the filter element.

The filter element 10 consists of a skeletal base or form of refractory ceramic fibers matted together and bonded together by a suitable high temperature binder such as colloidal alumina or colloidal silica. The mat-like form or base is preferably made in a vacuum forming operation wherein an aqueous colloidal alumina or silica slurry of the binder and short random lengths of the ceramic fibers is pulled by a vacuum onto a mold or mandrel. Thereafter the vacuum formed part is heat treated to dry the binder and thus bind the fibers together.

The mat-like skeletal form is not suitable for use as a gas filter for two reasons. One, at high face velocities some of the fibers would be pulled from the downstream surface of the filter element and thus contaminate the filtered gas. Two, during removal of a filter cake from the upstream surface of the filter element in a typical backwash operation where gas is blown at a high velocity in the reverse direction through the filter element, some of the fibers near the upstream surface of the filter element may adhere to the filter cake and be torn away from the filter element along with the cake.

In accordance with one aspect of the present invention the layers of ceramic fibers near both the upstream and downstream surfaces of the mat-like form are coated with a thin layer of alpha alumina or silica. Alpha alumina and silica have been found to withstand temperatures as high as 1600 degrees F. The surface coating of the fibers has been found to greatly strengthen the element while locking the ceramic fibers within the filter element. Moreover, the alpha alumina or silica coating reduces the mean pore size of the filter element to a more acceptable level. For example, where the initially vacuum formed mat-like fiber form has a mean pore size in the range of about 10 to 200 microns, after the fibers have been coated with the alpha alumina or silica the mean pore size may be in the range of about five to one-hundred microns but preferably between thirty and forty microns. It will be understood that the quantity of alpha alumina or silica which is applied to the mat-like fiber form is inversely proportional to the desired mean pore size of the surface coating which constitutes the filter layer.

The refractory fibers may be alumina silica, and if very pure, will have the following composition:

| | |
|---|---|
| $Al_2O_3$ | 48.2% |
| $SiO_2$ | 48.2% |
| $TiO_2$ | 1.1% |
| $Fe_2O_3$ | 0.5% |

Still purer aluminum oxide fibers having the following composition may, however, be used:

| | |
|---|---|
| $Al_2O_3$ | 97% |
| $SiO_2$ | 3% |

The binder may be either colloidal alumina or colloidal silica. If a colloidal silica is used with the less pure alumina silica fibers the skeletal form has the following composition:

| | |
|---|---|
| $Al_2O_3$ | 30.5% |
| $SiO_2$ | 67.7% |
| $TiO_2$ | 1.1% |
| $Fe_2O_3$ | 0.5% |

After the skeletal form has been coated with alpha alumina or colloidal silica it is preferably dried at a temperature in the range of 1700° F. to 2300° F. At the higher temperatures the coating is converted to the mullite phase which increases its resistance to corrosive attack by the hot gasses during use of the filter element.

While the present invention has been described in connection with particular embodiments thereof, it will be understood by those skilled in the art that many changes may be made without departing from the true spirit and scope of the present invention. Therefore, it is intended by the appended claims to cover all such changes and modifications which come within the true spirit and scope of this invention.

What I claim:

1. A method of making a filter element, comprising the steps of:

forming a skeletal member of refractory ceramic fibers each having a diameter between two and three microns and a length between five and ten millimeters bonded together by pulling an aqueous slurry of a ceramic binder and said fibers onto a mold, and heat treating the vacuum formed part to dry the binder, said skeletal member having a mean pore size greater then forty microns, then coating said skeletal member with a material selected from the group consisting of alumina gel, colloidal aluminum and colloidal silica to coat said fibers and to reduce the mean pore size of the member to between thirty and forty microns, and then heating said member to a temperature in the range of 1700 degrees F. to 2300 degrees F. to dry the coating and increase its resistance to corrosion by hot gasses.

2. The method according to claim 1, wherein said step of heating the coated member is carried out at a temperature of about 2300 degrees F. to convert the coating to the mullite phase.

* * * * *